US008525874B2

(12) United States Patent
Willmann et al.

(10) Patent No.: US 8,525,874 B2
(45) Date of Patent: Sep. 3, 2013

(54) ASSISTANCE SYSTEM FOR VISUALLY HANDICAPPED PERSONS

(75) Inventors: Richard Daniel Willmann, Siegburg (DE); Gerd Lanfermann, Aachen (DE); Juergen Te Vrugt, Aachen (DE); Edwin Gerardus Johannus Maria Bongers, Roermond (NL)

(73) Assignee: Koninklijke Philips N.V., Eindhoven (NL)

( * ) Notice: Subject to any disclaimer, the term of this patent is extended or adjusted under 35 U.S.C. 154(b) by 775 days.

(21) Appl. No.: 12/377,605

(22) PCT Filed: Aug. 7, 2007

(86) PCT No.: PCT/IB2007/053106
§ 371 (c)(1),
(2), (4) Date: Apr. 20, 2010

(87) PCT Pub. No.: WO2008/020362
PCT Pub. Date: Feb. 21, 2008

(65) Prior Publication Data

US 2010/0208045 A1 Aug. 19, 2010

(30) Foreign Application Priority Data

Aug. 15, 2006 (EP) .................................... 06118914

(51) Int. Cl.
*H04N 9/47* (2006.01)

(52) U.S. Cl.
USPC ............. 348/62; 348/142; 348/143; 348/154; 348/155

(58) Field of Classification Search
USPC ............................ 348/62, 142, 143, 154, 155
See application file for complete search history.

(56) References Cited

U.S. PATENT DOCUMENTS

| | | | | |
|---|---|---|---|---|
| 5,777,690 | A * | 7/1998 | Takeda et al. | 348/699 |
| 6,456,728 | B1 * | 9/2002 | Doi et al. | 382/103 |
| 7,546,204 | B2 * | 6/2009 | Yoshimine | 701/433 |
| 2004/0222892 | A1 * | 11/2004 | Balaban et al. | 340/573.7 |
| 2004/0225236 | A1 * | 11/2004 | Wheeler et al. | 600/595 |
| 2006/0028544 | A1 | 2/2006 | Tseng | |
| 2006/0056655 | A1 | 3/2006 | Wen et al. | |
| 2006/0129308 | A1 | 6/2006 | Kates | |

FOREIGN PATENT DOCUMENTS

| | | | |
|---|---|---|---|
| EP | 0774245 | A1 | 5/1997 |
| EP | 1754954 | A1 | 2/2007 |
| WO | 2001017838 | A1 | 3/2001 |
| WO | 03107039 | A2 | 12/2003 |
| WO | 2005108926 | A1 | 11/2005 |

* cited by examiner

*Primary Examiner* — Firmin Backer
*Assistant Examiner* — Jonathan Bui

(57) ABSTRACT

An assistance system for visually handicapped persons with visual impair in a part of their visual field aims at providing a technical solution for these persons, informing them actively about objects or movements in the visually impaired side, by way of body-worn sensors.

19 Claims, 2 Drawing Sheets

ASSISTANCE SYSTEM FOR VISUALLY HANDICAPPED PERSONS

Figure 1:
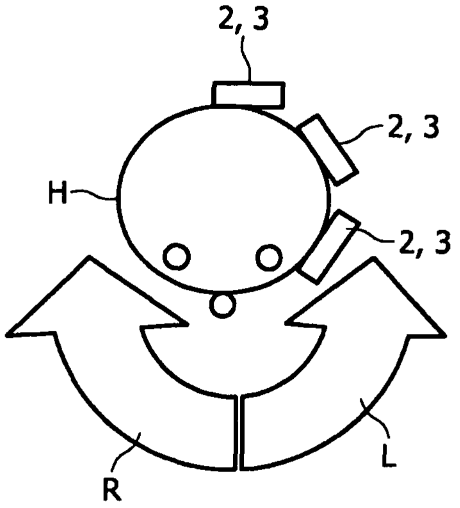

The present invention relates to an assistance system for visually handicapped persons and to a method for assisting visually handicapped persons.

Visual problems in a part of the visual field, like visual neglect or visual field loss, is a deficit shown by many stroke victims and traumatic brain injury survivors. Stroke is the third leading cause of death in the western world and the most prominent cause for permanent disabilities. The incidence in the United States is 700.000 per year, with a tendency to increase, according to the ageing of society. For example, per year 105.000 new patients show visual neglect. In contrast to defects of the eyes, such as short-sightedness, the decrease in the field of view is of neurological origin. Thus, these patients frequently collide with objects, making their life dangerous and limiting their ability for independent living.

United States Patent Application Publication 2006/0028544 A1 refers to an electronic blind guidance cane with an electronic eye system which is capable of prompting an acoustic or tactile warning, whenever a solid or liquid obstruction is detected. It is a drawback of the known electronic eye system that it is not capable of distinguishing moving objects from stationary objects.

It is therefor an object of the present invention to provide an assistance system for visually handicapped persons with enhanced recognition of moving objects.

The above objective is accomplished by an assistance system for visually handicapped persons, comprising a first orientation sensor, being adapted for arrangement proximal to a trunk of the person, for detecting a movement of the person, a second orientation sensor, being adapted for arrangement at a head of the person, for detecting a movement and orientation of the head of the person, at least one motion detector for detecting a movement and/or presence of an object, the motion detector being adapted for arrangement at the head of the person, an evaluation system for comparing data from the motion detector and the first and second orientation detector.

The first and second orientation sensors, in the sense of the invention, detect the movement of the person himself. The motion detectors, in the sense of the invention, detect the presence and/or movement of objects in the surrounding vicinity of the person. If the person himself is moving and/or turning his or her head, the surrounding vicinity moves relative to the motion detectors. The evaluation system in the sense of the invention, at least comprises any kind of digital signal processing device.

It is an advantage of the assistance system according to the invention, that by comparing the data from the motion detector and the first and second orientation detector in the evaluation system, actually moving objects can be distinguished even though the person and/or his head is moving as well. A further advantage is, that the information from the detectors enable the evaluation system, to decide whether the person will collide with a detected object or not. The invention aims at providing a technical solution for visually handicapped persons, informing them actively about objects or movements in the "hidden" side of their field of view. As the looking direction of the person is known, the assistance system will not inform the person of movements or objects which have been recognised by the person anyway, thus providing a more independent living, higher quality of life of the patient and reduced serious situations, like collisions.

Suitable motion detectors are commonly known in the art. Preferably, the motion detectors comprise of one or more of a video or infrared camera, a radar, laser or sonar sensor which, more preferable, are adjusted to cover an impaired area of the visual field of the patient.

A common visual effect of brain injury or stroke is the loss of the person's visual field or our ability to see to the side. There are many types of visual field losses that can occur, but the most common form is a homonymous hemianopsia or loss of half of the field of vision in each eye. If the posterior portion of the brain is damaged on one side of the brain, a loss of visual field occurs to the opposite side in both eyes. Patients often mistakenly believe the loss is just in one eye. When certain portions of the brain are damaged, the patient may also fail to appreciate space to one side, which is usually to the left. Unlike visual field loss, this problem is not a physical loss of sensation, but rather a loss of attention to the area. Unilateral neglect is a disorder of attention where patients are unable to attend to stimuli, such as objects and people, located on one side of space. It most commonly results from brain injury or stroke to the right cerebral hemisphere, causing visual neglect of the left-hand side of space.

The motion detector and the second orientation sensor are preferably arranged at spectacles, a headband, hat or cap which is wearable by the patient. Advantageously the head movement of the person is followed by both the motion detector and the second orientation sensor.

In a preferred embodiment, the assistance system comprises an infrared, radar (radiowave detection and ranging), lidar (light detection and ranging), laser or sonar emitter, wherein the infrared, radar, lidar, laser or sonar emitter is more preferable arranged in a backpack which is wearable by the patient. By using an active emitter in the system, the reliability of the system may advantageously be enhanced, in particular with respect to fast moving objects, for example in traffic. If a patient is wheelchair-bound, the infrared, radar, lidar, laser or sonar emitter may as well be attached to the wheelchair.

In a preferred embodiment, the first and/or the second orientation sensor comprises a magnetometer and/or an accelerometer. In particular, a vector magnetometer is used for the determination of the orientation of the person's head and/or body by detecting changes in magnetic fields. Vector magnetometers have the capability to measure the components of magnetic fields in a particular direction. The use of three orthogonal vector magnetometers, for example, allows the magnetic field strength, inclination and declination to be uniquely defined. The accelerometer is used for determining accelerations exerted on the orientation sensor to make out movements of the person and his head. Most preferable, the first and/or second orientation sensor is a combined magnetometer and accelerometer which may particularly be miniaturised to fit on a printed circuit board, such as of a mobile phone, for example.

The first orientation sensor is preferably arranged at a belt which is wearable by the person. Alternatively, for wheelchair-bound persons, the first orientation sensor is preferably arranged at a wheelchair.

In a preferred embodiment of the assistance system, evaluation system comprises a microprocessor, adapted to compute a global optical flow from the data of the first and second orientation sensors. Optical flow, in the sense of the invention, is a concept for estimating the motion of objects within a visual representation. Typically, the motion is represented as vectors originating from or terminating at pixels in a digital image sequence, detected by the motion sensor. The computed global optical flow in the sense of the invention, represents the relative movement of the surrounding environment of the person, due to the movement of the person and/or the person's head. Furthermore preferred, the microprocessor compares the computed global optical flow to an actual optical flow detected by the motion detector to determine the presence of moving obects. If there are no moving objects, for example, the global optical flow matches the detected actual optical flow. Thus, any moving objects result in a difference between the global optical flow and the detected actual optical flow, which is advantageously used for identification of the moving object.

Preferably, the evaluation system further comprises a data storage device. In particular the data storage device stores information on the person's field of view, for example, data on the visual angle, where the vision of the person is impaired. The assistance system advantageously does not take detected moving objects into account which the person is able to see himself. The acceptance of the assistance system is thus enhanced, as the person does not receive unnecessary bothering warnings.

The assistance system preferably comprises a feedback device for alarming the person, for example a sound generator or vibration alarm, preferably in the form of a wristband or wristwatch. In particular, the person is only warned if a moving object is determined outside his field of view.

Preferably, the assistance system further comprises a communication system, connecting the components of the inventive assistance system, in particular the microprocessor to the motion detector, the first and second orientation sensors, the feedback device and the storage device. In a particularly preferred embodiment, the communication system is at least partly wireless. Due to the remotely arranged components of the inventive assistance system, wireless communication is advantageous, in particular as a so-called wireless personal area network (WPAN).

Another object of the present invention is a method for assisting a visually handicapped person, the method comprising the steps of a1) determining a movement of the person by means of a first orientation sensor which is arranged proximal to a trunk of the person, a2) determining a viewing direction of the person by means of a second orientation sensor which is arranged at a head of the person, b) computing a global optical flow from the data of the first and second orientation sensor by means of a microprocessor, c) detecting an actual optical flow, by means of at least one motion detector which is arranged at the head of the person and d) identifying a moving object by comparing the computed global optical flow to the actual optical flow.

Steps b), c) and d) in particular, comprise digital image processing of a video camera or infrared camera signal. Optical flow is advantageously useful in pattern recognition, computer vision, and other image processing applications. Some methods for determining optical flow are phase correlation (inverse of normalized cross-power spectrum), block correlation (sum of absolute differences, normalized cross-correlation), gradient constraint-based registration, the Lucas Kanade Method and the Horn Schunck Method.

Preferably, the method further comprises the steps of:

e) determining a direction of motion of the identified moving object, f) comparing the direction of motion of the identified moving object to the movement of the person and g) alarming the person by means of a feedback device if a collision between the identified moving object and the person is predictable.

Preferably, the method further comprises the step of alarming the person by means of a feedback device if the identified object is outside a field of view of the person. Information on the field of view of the person is preferably stored on a storage device. It is an advantage that the person is only alarmed if a collision with the identified object is actually likely and/or if the person cannot see the identified object by himself.

In an alternative embodiment, a fast moving and/or metallic object is detected by means of a radar or lidar detector. Radar and lidar detectors are advantageously adaptable to traffic situations which pose the highest risk for visually impaired persons.

A further object of the invention is a use of the assistance system as described in here before, in neurological rehabilitation of stroke or traumatic brain injury victims suffering from visual neglect an/or visual field loss. The assistance system may advantageously be applied for monitoring and training of stroke or traumatic brain injury victims or as a stand-alone adjuvant means for these persons.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

Figure 2:
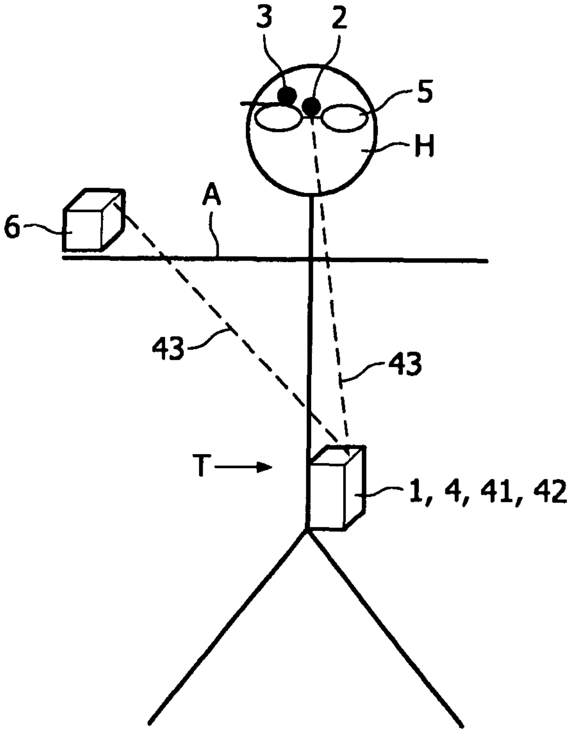

FIGS. 1 and 2 schematically show an assistance system according to the invention and illustrate the application of the assistance system.

Figure 3:
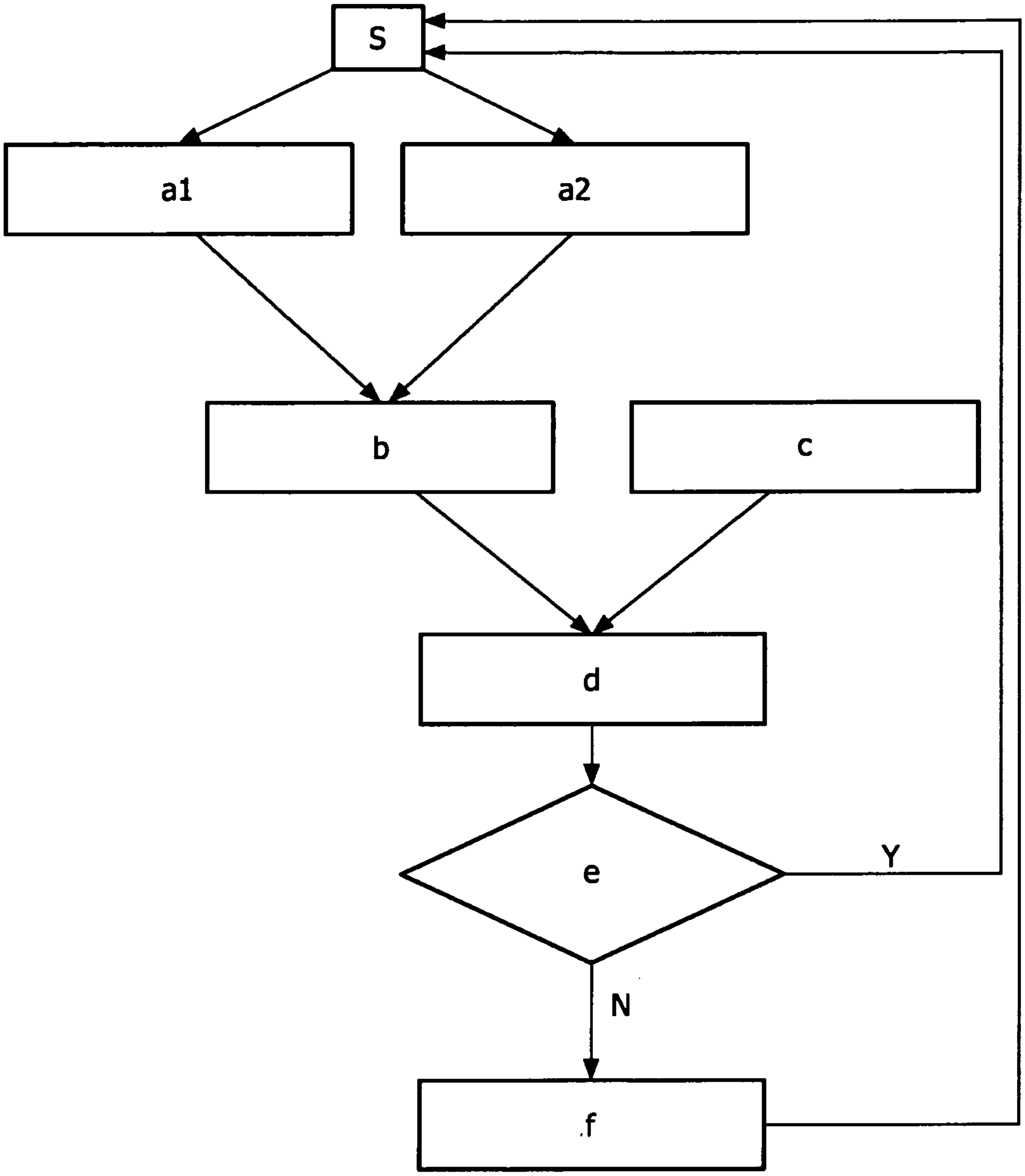

FIG. 3 illustrate the method according to the present invention in a flow diagram.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the present description and claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

FIG. 1 shows a schematic top view of a head H of a person. The arrow R in the right hemisphere of the person represents an unimpaired field of view, whereas the person's vision in his left hemisphere, indicated by arrow L, is impaired, for example due to visual neglect or visual field loss. The assistance system according to the present invention is at least partly attached to the person's head H in order to account for head movements of the person. Here, a second orientation sensor 2 and a number of motion detectors 3, in particular cameras are attached around the head. The person skilled in the art recognises that the inventive assistance system is applicable outside the natural field of view of a human, i.e. the assistance system is as well capable to provide information to a person, with or without any visual impair, about movements behind his back.

In FIG. 2, the person is schematically depicted with all components of the assistance system according to the invention. To use the assistance system, the person wears on his head H the second orientation sensor 2 and the motion detector 3, preferably on glasses 5 that the person is wearing. The motion detector 3 preferably comprises one or more miniature cameras. The first orientation sensor 1, or trunk T orientation sensor, and a microprocessor 41 are worn, for example, as a mobile phone like device on the belt. The microprocessor 41, together with a storage device 42 forms an evaluation system 4. A feedback device 6, for example a vibration alarm or sound alarm is worn as a bracelet around the arm A. Here it is important to choose the arm of the person, that has not suffered from the stroke or traumatic brain injury incident. The assistance system then follows the direction of movement of the patient, as well as his direction of view. Using the motion detector 3 and the microprocessor 41 of the evaluation system 4, moving objects in the scene are recognised and it is determined whether the person has noticed them on his own, based on stored information on the field of view of the person, the information being stored on the storage device 42. If it is determined that the moving object might have escaped the attention of the person, the vibration or sound alarm of the feedback device 6 is triggered and the person becomes aware of the situation.

The first orientation sensor 1 and the evaluation system 4, comprising the microprocessor 41 and the storage device 42, may be arranged together in a common housing. The body worn sensors, i.e. the second orientation sensor 2 and the motion detector 3, as well as the feedback device 6, form a network that is preferably based on wireless transmission and communication, indicated by dotted connection lines 43. Here, sensor platforms which communicate via a certain standard are known in the art, as for example the Zigbee standard. ZigBee is the name of a specification for a suite of high level communication protocols using small, low-power digital radios based on the IEEE 802.15.4 standard for wireless personal area networks. The first and second orientation sensors 1, 2 are combinations of magnetometers and accelerometers. They are preferably miniaturised to fit on a printed circuit board, for example of a mobile phone. A viable choice for the microprocessor 41 is an ultra-low power digital signal processing (DSP) device.

The method according to the invention and thus an information flow in a processing software for the microprocessor 41 is sketched in FIG. 3. The process starts at initial point S. The steps of determining a movement of the person (a1) and determining a viewing direction of the person (a2) and subsequent computing of a global optical flow from the data (b) are executed simultaneous to the detection of an actual optical flow (c) by the motion detector 3. When computing optical flow, it is important to discern global optical flow due to the motion of the person relative to static objects and the flow of objects moving themselves. The latter ones are the most interesting ones from the perspective of the patient. The evaluation system 4 identifies those moving objects by comparing the computed global optical flow to the actual optical flow (d). In step (e) it is determined whether the moving object is in the field of view of the person by comparing the position of the moving object to the stored field of view data on the storage device 42. If the moving object is not in the field of view of the person (N), an alarm is raised (f) by the feedback device 6. If the person is able to see the moving object by himself (Y), the iteration is finished without any further action.

In a first embodiment the invention defines an assistance system for visually handicapped persons comprising

- a first orientation sensor 1, being adapted for arrangement proximal to a trunk of the person, for detecting a movement of the person,
- a second orientation sensor 2, being adapted for arrangement at a head of the person, for detecting a movement and orientation of the head of the person,
- at least one motion detector 3 for detecting a movement or presence of an object, the motion detector being adapted for arrangement at the head of the person,
- an evaluation system 4 for comparing data from the motion detector 3 and the first and second orientation detector 1, 2.

The invention further defines a use of said assistance system in neurological rehabilitation of stroke or traumatic brain injury victims suffering from visual neglect and/or visual field loss.

In a second embodiment the assistance system of the first embodiment the evaluation system 4 comprises a data storage device 42, storing information on the person's field of view.

In a third embodiment the assistance system of the first embodiment the evaluation system 4 comprises a microprocessor 41, adapted to compute a global optical flow from the data of the first and second orientation sensors 1, 2, the microprocessor 41 comparing the computed global optical flow to an actual optical flow detected by the motion detector 3 to determine the presence of moving objects.

In a fourth embodiment the assistance system of the first embodiment further comprises a feedback device 6 for alarming the person, in particular if a moving object is determined outside his field of view.

In a fifth embodiment the assistance system according to the second, third and fourth embodiment further comprises a communication system 43, particularly connecting the microprocessor 41 to one or more of the motion detector 3, the first and second orientation sensors 1, 2, the feedback device 6 and the storage device 42.

In a sixth embodiment of the assistance system according to the fifth embodiment the communication system 43 is at least partly wireless.

The invention further relates to a method for assisting a visually handicapped person. In a first embodiment said method comprises the steps of

- a1) determining a movement of the person by means of a first orientation sensor 1 which is arranged proximal to a trunk of the person,
- a2) determining a viewing direction of the person by means of a second orientation sensor 2 which is arranged at a head of the person,
- b) computing a global optical flow from the data of the first and second orientation sensor 1, 2 by means of a microprocessor 41, c) detecting an actual optical flow, by means of at least one motion detector (3) which is arranged at the head of the person and d) identifying a moving object by comparing the computed global optical flow to the actual optical flow.

In a second embodiment of the method according to the first embodiment information on the field of view of the person is stored on a storage device 42.

In a third embodiment of the method according to the first embodiment the steps b), c) and d) comprise digital image processing of a video camera or infrared camera signal.

The invention claimed is:

1. An assistance system for a visually handicapped person comprising:

a first orientation sensor being adapted for arrangement proximal to a trunk of the person, for determining a movement of the person;

a second orientation sensor being adapted for arrangement at a head of the person, for determining a movement and orientation of the head of the person;

at least one motion detector for detecting a movement or presence of an object, the motion detector being adapted for arrangement at the head of the person; and an evaluation system for comparing data from the motion detector and the first and second orientation sensors, wherein the evaluation system comprises a microprocessor configured to compute a global optical flow from the data of the first and second orientation sensors, the microprocessor comparing the computed global optical flow to an actual optical flow detected by the motion detector to determine the presence of moving objects.

2. The assistance system according to claim 1, wherein the motion detector comprises one or more of a video or infrared camera, a radar, lidar, laser or sonar sensor.

3. The assistance system according to claim 1, wherein the motion detector is adjusted to cover an area of visual neglect or visual field loss of the person.

4. The assistance system according to claim 1, wherein the motion detector and the second orientation sensor are arranged at spectacles, a headband, hat or cap which is wearable by the person.

5. The assistance system according to claim 2, further comprising an infrared, radar, lidar, laser or sonar emitter.

6. The assistance system according to claim 5, wherein the infrared, radar, laser or sonar emitter is arranged in a backpack which is wearable by the patient.

7. The assistance system according to claim 1, wherein the first and/or the second orientation sensor comprises a magnetometer and/or an accelerometer.

8. The assistance system according to claim 1, wherein the first orientation sensor is arranged at a belt which is wearable by the person.

9. The assistance system according to claim 1, wherein the first orientation sensor is arranged at a wheelchair.

10. The assistance system according to claim 1, wherein the evaluation system comprises a data storage device, storing information on the person's field of view.

11. The assistance system according to claim 10, further comprising a feedback device for alarming the person if a moving object is determined outside a field of view of the person.

12. The assistance system according to claim 1, further comprising a communication system connecting the microprocessor to one or more of the motion detector, the first and second orientation sensors, the feedback device and the storage device.

13. The assistance system according to claim 12, wherein the communication system is at least partly wireless.

14. A method for assisting a visually handicapped person, comprising the acts of:

a1) determining a movement of the person by a first orientation sensor which is arranged proximal to a trunk of the person, a2) determining a viewing direction of the person by a second orientation sensor which is arranged at a head of the person, b) computing a global optical flow from the data of the first and second orientation sensor by a microprocessor;

c) detecting an actual optical flow by at least one motion detector which is arranged at the head of the person; and d) identifying a moving object by comparing the computed global optical flow to the actual optical flow.

15. The method according to claim 14, further comprising the acts of:

e) determining a direction of motion of the identified moving object, f) comparing the direction of motion of the identified moving object to the movement of the person; and g) alarming the person by a feedback device if a collision between the identified moving object and the person is predictable.

16. The method according to claim 14, further comprising the act of alarming the person by means of a feedback device if the identified object is outside a field of view of the person.

17. The method according to claim 14, wherein information on the field of view of the person is stored on a storage device.

18. The method according to claim 14, wherein the acts b), c) and d) comprise digital image processing of a video camera or infrared camera signal.

19. The method according to claim 14, wherein a fast moving and/or metallic object is detected by a radar or lidar detector.

* * * * *